US012600420B2

(12) United States Patent
Magner

(10) Patent No.: US 12,600,420 B2
(45) Date of Patent: Apr. 14, 2026

(54) SLIDER WHEEL HAVING A PLURALITY OF SLIDER SURFACES

(71) Applicant: Caterpillar Inc., Peoria, IL (US)

(72) Inventor: Scott H. Magner, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 347 days.

(21) Appl. No.: 18/347,704

(22) Filed: Jul. 6, 2023

(65) Prior Publication Data

US 2025/0010926 A1      Jan. 9, 2025

(51) Int. Cl.
B62D 55/084      (2006.01)
B62D 55/15      (2006.01)
B62D 55/32      (2006.01)

(52) U.S. Cl.
CPC ......... B62D 55/0847 (2013.01); B62D 55/15 (2013.01); B62D 55/32 (2013.01)

(58) Field of Classification Search
CPC .... B62D 55/0847; B62D 55/15; B62D 55/32; B62D 55/10
See application file for complete search history.

(56) References Cited

U.S. PATENT DOCUMENTS

| | | | | |
|---|---|---|---|---|
| 5,941,326 | A | * | 8/1999 | Fleuchaus .......... B62D 55/0847 |
| | | | | 180/9.1 |
| 8,870,305 | B2 | | 10/2014 | Beasley et al. |
| 2001/0054844 | A1 | | 12/2001 | Rutz et al. |
| 2005/0040706 | A1 | * | 2/2005 | Yamamoto ......... B62D 55/0882 |
| | | | | 305/139 |
| 2006/0028066 | A1 | | 2/2006 | Yamamoto |
| 2018/0065691 | A1 | * | 3/2018 | Dumitru ............ B62D 55/0847 |
| 2018/0170463 | A1 | * | 6/2018 | Dumitru ............... B62D 55/10 |
| 2021/0276638 | A1 | * | 9/2021 | Schroyer ............ B62D 55/0845 |
| 2022/0242502 | A1 | * | 8/2022 | Baldwin ............... B62D 55/10 |
| 2022/0348274 | A1 | * | 11/2022 | Zaharia ............. B62D 55/0847 |

FOREIGN PATENT DOCUMENTS

| | | |
|---|---|---|
| FR | 2636908 | 3/1990 |
| GB | 2519522 | 4/2015 |
| JP | H1081271 A | 3/1998 |
| JP | 2021000871 A | 1/2021 |

* cited by examiner

*Primary Examiner* — Kip T Kotter

(57) ABSTRACT

A slider wheel for a track support assembly may include a first side surface, a second side surface, and a plurality of distinct, arc-shaped slider surfaces, the plurality of slider surfaces forming a non-circular sliding circumferential surface located between the first side surface and the second side surface. The slider wheel may also include a plurality of pin holes in at least one of the first side surface and the second side surface, the plurality of pin holes being configured to secure the slider wheel in position.

20 Claims, 6 Drawing Sheets

SLIDER WHEEL HAVING A PLURALITY OF SLIDER SURFACES

TECHNICAL FIELD

The present disclosure relates generally to a slider wheel for a track support assembly of a machine, and, more particularly, to a slider wheel having a plurality of slider surfaces.

BACKGROUND

Track assemblies of track type machines, such as dozers, excavators, and skid-steer loaders, include track carrier devices that support tracks, of an endless loop of tracks or a track chain, as the tracks travel between a sprocket and an idler assembly. The track carrier devices also aid in maintaining proper track sag or slack of the track chain. Typically, the track carrier devices are carrier rollers or sliders. During operation of the track assemblies, as the track type machine moves, the track chain rotates, with tracks engaging the ground and subsequently contacting the track carrier rollers or sliders. Dirt and debris from the tracks builds up on and encases the track carrier rollers, preventing the track carrier rollers from rotating. In other words, the carrier roller may get stuck. A surface of the carrier roller may then wear unevenly, as a result of the carrier roller being stuck and not being able to freely rotate, or the carrier roller may no longer make contact with the tracks. Tracks of the track chain may also be subject to increased wear as a result of a stuck carrier roller. Thus, carrier rollers require relatively frequent replacement, which requires downtime and added costs associated with use of such machines. Sliders have been used, as an alternative to rollers, having lower cost and requiring relatively less maintenance. However, track sliders may require unique mounting mechanisms and may have relatively short work lives, due to a single slider surface thereof being subjected to wear from the tracks.

To provide a track type machine in which dirt and debris are less likely to accumulate on a frame of the machine, Japanese Patent Publication No. JP2021000871 (the '871 publication) provides for an inclined frame, and a support for a roller, the support having two legs arranged apart from each other in a traveling direction of a crawler type traveling body, such as a track, so that dirt and debris are less likely to accumulate. In particular, the distance between the two legs of the support is greater than an outer diameter of the roller, so that dirt and debris falling from the roller are not as likely to be blocked by the legs, and instead slide down between the legs, onto the inclined frame, and then off of the machine. The device of the '871 publication thus requires a specialized frame and support arrangement, and does not provide for an easily replaceable part that also serves to minimize or prevent uneven wear on the track roller.

The slider wheel, and related assembly and method for adjustment, of the present disclosure may solve one or more of the problems set forth above and/or other problems in the art. The scope of the current disclosure, however, is defined by the attached claims, and not by the ability to solve any specific problem.

SUMMARY

In one aspect of the present disclosure, a slider wheel for a track support assembly may include a first side surface, a second side surface, a plurality of distinct, arc-shaped slider surfaces, the plurality of slider surfaces forming a non-circular sliding circumferential surface located between the first side surface and the second side surface, and a plurality of pin holes in at least one of the first side surface and the second side surface, the plurality of pin holes configured to secure the slider wheel in position.

In another aspect of the present disclosure, a track support assembly for a track-type machine may include a slider wheel having a first side surface, a second side surface, a plurality of distinct, arc-shaped slider surfaces, the plurality of slider surfaces forming a non-circular sliding circumferential surface located between the first side surface and the second side surface, and a plurality of slider wheel pin holes in at least one of the first side surface and the second side surface. The track support assembly may also include at least one carrier stand having a carrier stand pin hole, and a pin insertable into the carrier stand pin hole and one of the plurality of slider wheel pin holes, such that when the pin is inserted into the carrier stand pin hole and the one of the plurality of slider wheel pin holes, the pin secures the slider wheel in a position.

In still another aspect of the present disclosure, a method for adjusting slider wheel of a track support assembly may include inserting a pin of the track support assembly into a carrier stand pin hole, of at least one carrier stand of the track support assembly, and into one of a plurality of slider wheel pin holes, of a slider wheel of the track wheel assembly, the one of the plurality of slider wheel pin holes aligning with the carrier stand pin hole, to prevent rotation of the slider wheel relative to the at least one carrier stand, removing the pin from the carrier stand pin hole and the one of the plurality of slider wheel pin holes, rotating the slider wheel on a support member of the track support assembly, until another one of the plurality of slider wheel pin holes aligns with the carrier stand pin hole, and inserting the pin into the carrier stand pin hole and into the other one of the plurality of slider wheel pin holes, to prevent rotation of the slider wheel relative to the at least one carrier stand.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion, such that a process, method, article, or apparatus that comprises a list of elements does not include only those elements, but may include other elements not expressly listed or inherent to such a process, method, article, or apparatus. Moreover, in this disclosure, relative terms, such as, for example, "about," "generally, "substantially," and "approximately" are used to indicate a possible variation of +10% in the stated value.

Figure 1:
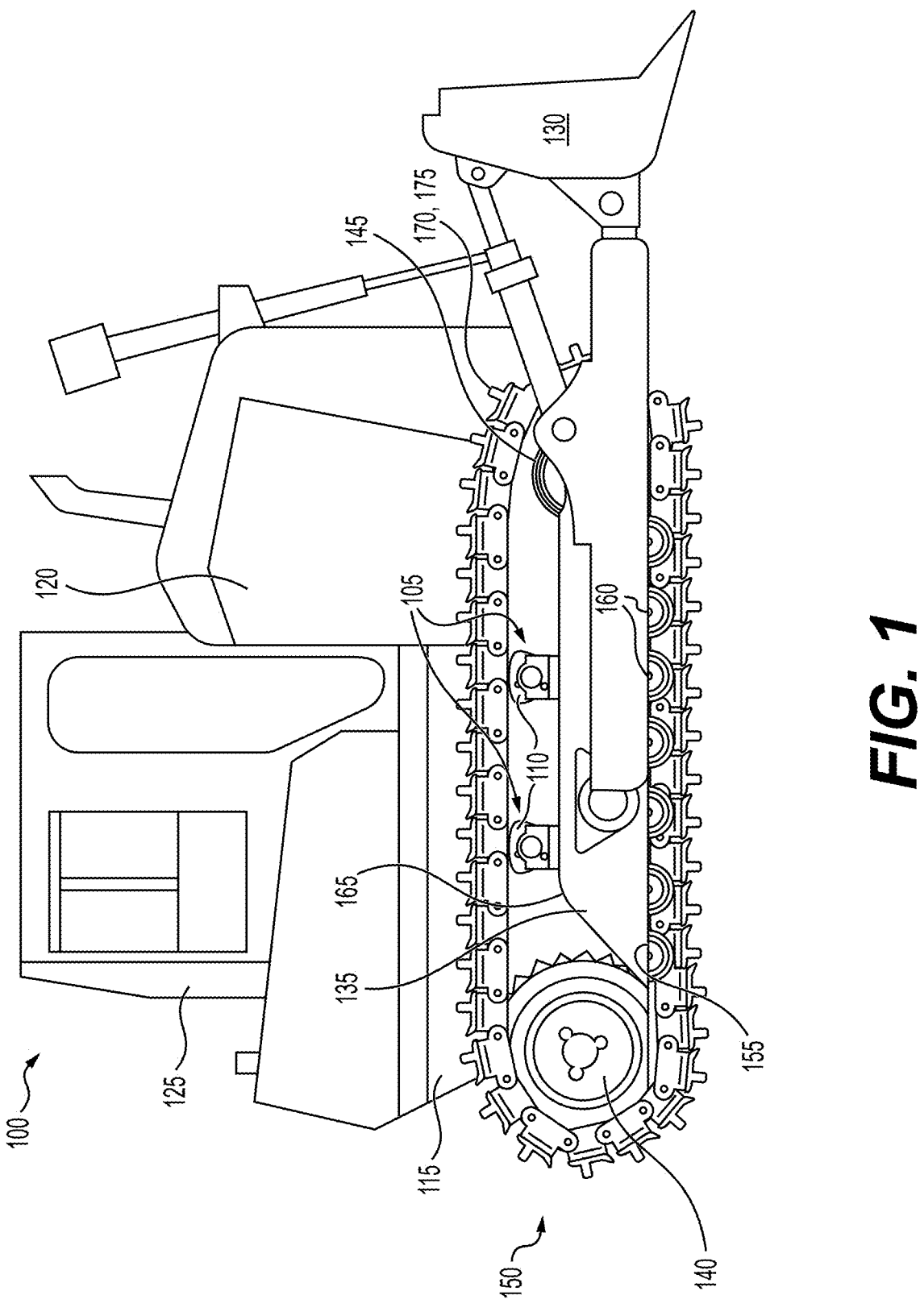
FIG. 1 shows a schematic side view of a dozer, as an example of a track type machine, having a track support assembly including a slider wheel, in accordance with the present disclosure.

FIG. 1 shows a schematic side view of a dozer 100, as an example of a track type machine, having a track support assembly 105 including a slider wheel 110, in accordance with the present disclosure. The dozer 100 includes a machine frame 115, supporting an engine 120, an operator station 125, and a work tool or implement 130, and a track support frame 135, provided as part of the undercarriage of the machine frame 115. The track support frame 135 supports a sprocket 140, an idler assembly 145, and the work tool 130, and a track assembly 150. The track support frame 135, as part of the track assembly 150, has a lower surface 155, on which lower track support assemblies 160 are provided, and an upper surface 165, on which one or more upper track support assemblies 105 are provided. In addition, a track chain 170, which is an endless loop of tracks 175, is provided around the lower track support assemblies 160 and the upper track support assemblies 105. During operation, the engine 120 may generate a power output directed through the sprocket 140 and the track chain 170, moving the tracks 175 around the track support assemblies 105, to propel the dozer 100 forward or backwards.

Figure 2:
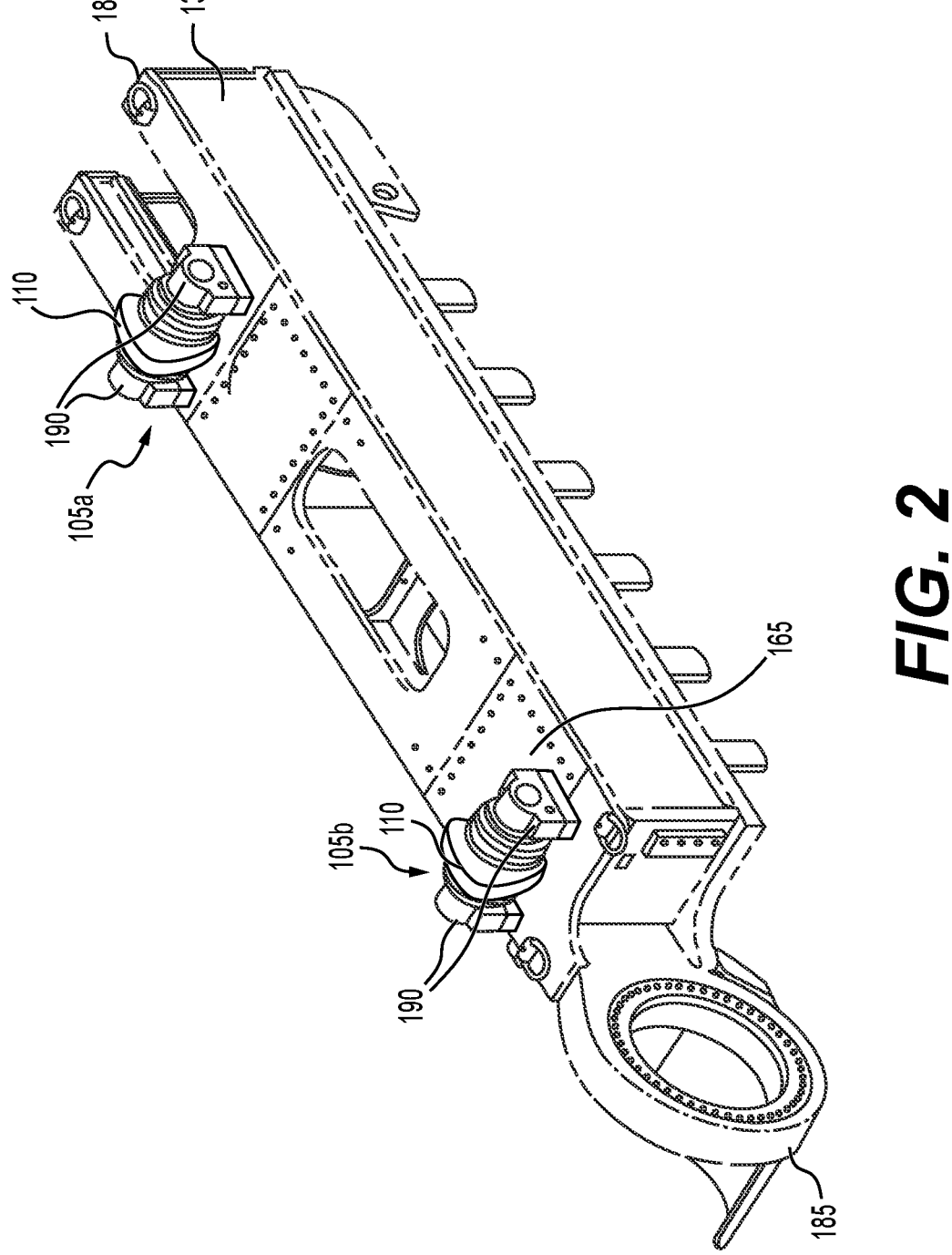
FIG. 2 shows a schematic isometric view of a track support frame and track support assemblies, including carrier stands and slider wheels, of the track type machine shown in FIG. 1, in accordance with the present disclosure.

FIG. 2 shows a schematic isometric view of the track support frame 135 and track support assemblies 105, which are the upper track support assemblies 105, of the track assembly 150 shown in FIG. 1. The track support frame 135 may have a forward or proximal end 180 and a rear or distal end 185. In the embodiment shown, as an example, the track assembly 150 includes two upper track support assemblies 105, with one track support assembly 105a near or toward the proximal end 180 of the track support frame 135, and the other track support assembly 105b near or toward the distal end 185 of the track support frame 135. The position(s) of the one or more track support assemblies 105 on the track support frame 135 is not limited to the position(s) shown in FIG. 2.

Figures 4, 5:
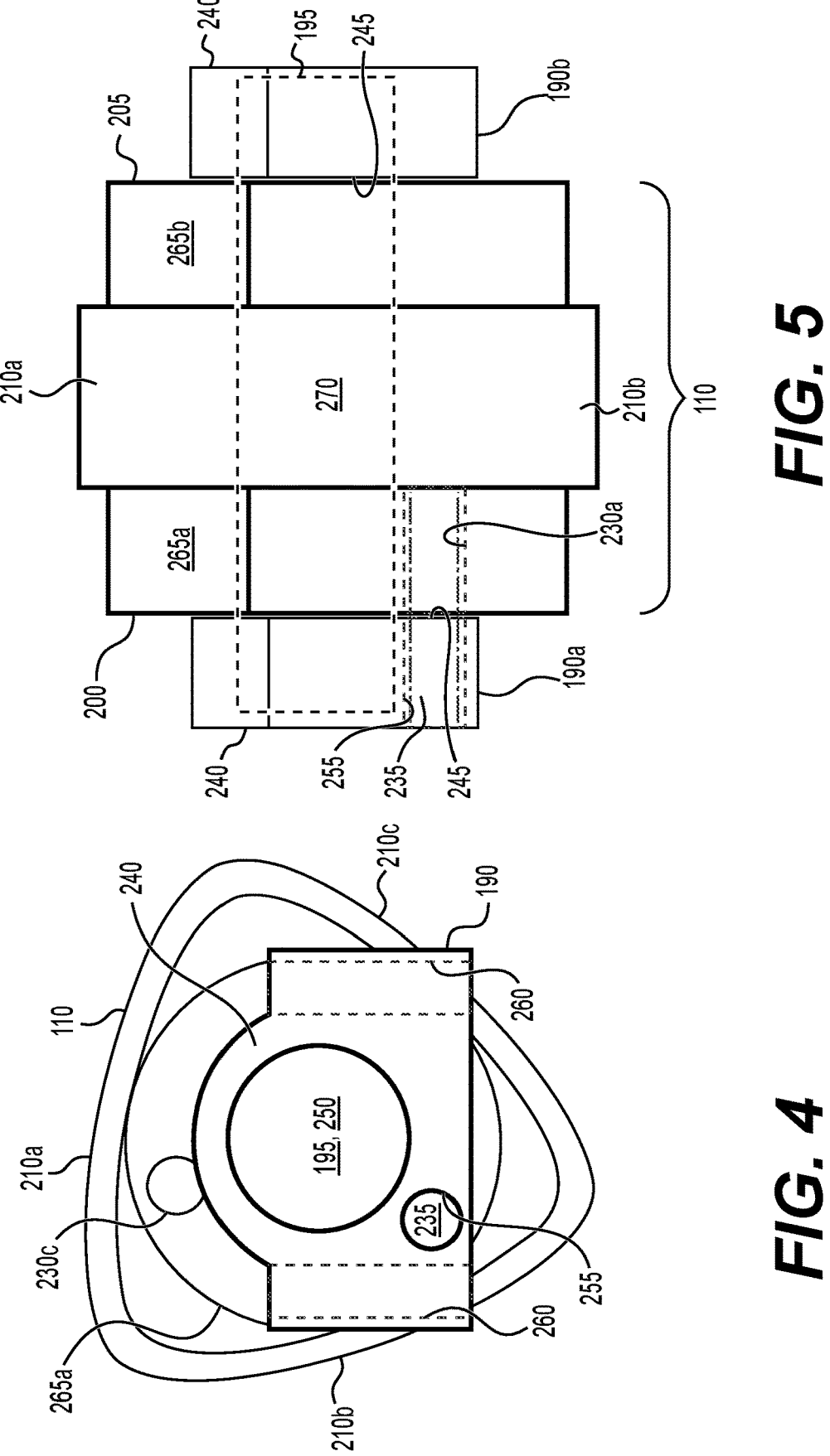
FIG. 4 shows a schematic side view of the slider wheel and carrier stand of the track support assemblies shown in FIG. 2.
FIG. 5 shows a schematic end view of the slider wheel and carrier stand shown in FIG. 4.

Each track support assembly 105 may have a slider wheel 110, at least one carrier stand 190, and a support member 195 (shown in FIGS. 4 and 5). In the embodiment shown in FIG. 2, each track support assembly 105 has two carrier stands 190, and one slider wheel 110 in between the two carrier stands 190. In an alternative embodiment, each track support assembly 105 may have one carrier stand 190. As described in more detail below, each carrier stand 190 supports the slider wheel 110, to allow the tracks 175 of the track chain 170 to pass over the slider wheel 110 during operation of the track assembly 150.

Figure 3:
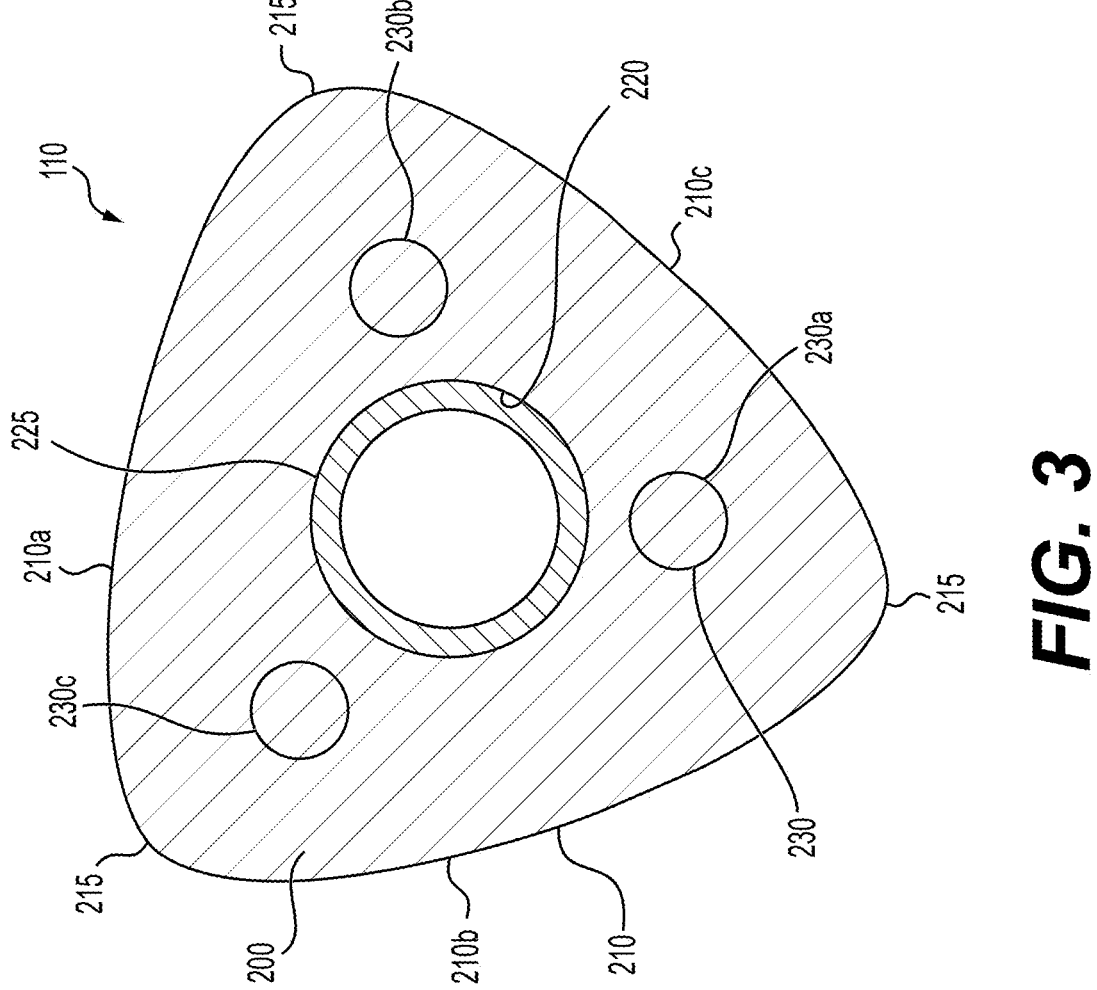
FIG. 3 shows a cross-sectional side view of a slider wheel of the track support assemblies shown in FIG. 2.

FIG. 3 shows a cross-sectional side view of the slider wheel 110 of the track support assemblies 105 shown in FIG. 2. The slider wheel 110 has a first side surface 200 and a second side surface 205 (shown in FIG. 5), opposite to the first side surface 200. The slider wheel 110 also has a plurality of distinct, arc-shaped slider surfaces 210 that form a non-circular sliding circumferential surface located between the first side surface 200 and the second side surface 205. In the embodiment shown in FIG. 3, the slider wheel 110 has three slider surfaces 210: a first slider surface 210a, a second slider surface 210b, and a third slider surface 210c. The number of slider surfaces 210 is not, however, limited to three, and may be two, four, five, or more. The slider surfaces 210 may be curved or arc-shaped, as noted above, to facilitate sliding of tracks 175 across one of the slider surfaces 210. For example, the slider surfaces 210 may have a radius of curvature in a range of about 200 mm to about 1000 mm, depending on a size of the machine. In addition, edges or corners 215 between the slider surfaces 210 may also be rounded. For example, the corners 215 between the slider surfaces 210 may have a radius of curvature in a range of about 10 mm to about 50 mm, depending on a size of the machine. The slider wheel 110 may have a height in a range of about 200 mm to about 500 mm, depending on a size of the machine, and an overall width in a range of about 200 mm to about 500 mm, depending on a size of the machine. In one particular example, the height may be about 466 mm and the overall width may be about 418 mm. The slider wheel 110 may be formed of a wear resistant material, a weld overlay, or other abrasive resistant materials. The wear resistant material may be a work hardened material or a heat hardened material, such as a heat treated alloy. As one specific example, the wear resistant material may be manganese steel (also known as mangalloy, Mn steel, or Hatfield's steel).

The slider wheel 110 also has a slider wheel central opening 220, located in a center of the first side surface 200 and the second side surface 205 and extending completely through the slider wheel 110. The support member 195, such as an axle, of the track support assembly 105 extends through the slider wheel central opening 220 to support the slider wheel 110, as described in more detail below. The support member 195 may be a cylindrical rod or shaft. In addition, the support member 195 and could have steps, that is, portions having different outer diameters and/or cross-sectional shapes. Also, the support member 195 may be separate from the slider wheel 110, or it may be one with the slider wheel 110, as in, it may be integrally formed with the slider wheel 110. A slider wheel bushing 225 may be provided within the slider wheel central opening 220, to facilitate rotation of the slider wheel 110 relative to the support member 195. In this embodiment, the slider wheel 110 rotates relative to the support member 195, so that a position of the slider wheel 110 relative to the carrier stand 190 may be adjusted. A lubricant and one or more seals (not shown) may be provided between the slider wheel 110 and the support member 195. A diameter of the slider wheel central opening 220 may be in a range of about 50 mm to about 200 mm, depending on the size of the machine, for example. A diameter of the slider wheel central opening 220, or of the slider wheel bushing 225, in case one is provided within the slider wheel central opening 220, may be slightly greater than a diameter of the support member 195.

FIG. 3 also shows a plurality of slider wheel pin holes 230, which are provided through at least one of the first side surface 200 and the second side surface 205 of the slider wheel 110. The plurality of pin holes 230 may be located or arranged radially relative to the slider wheel central opening 220. In the embodiment shown in FIG. 3, the slider wheel 110 has three slider wheel pin holes 230 in the first side surface 200: a first slider wheel pin hole 230a, a second slider wheel pin hole 230b, and a third slider wheel pin hole 230c. The number of slider wheel pin holes 230 is not, however, limited to three and may be less than three or greater than three. In one embodiment, the number of the slider wheel pin holes 230 is the same as the number of slider surfaces 210, such that a pin hole may be used to secure a corresponding slider surface in position for use, as discussed in more detail below. The slider wheel pin holes 230 are spaced evenly around the slider wheel central opening 220. The plurality of slider wheel pin holes 230 may extend partially through the slider wheel 110, such that openings of the plurality of slider wheel pin holes 230 are only provided on one of the first side surface 200 and the second side surface 205. Alternatively, the plurality of slider wheel pin holes 230 may extend through the slider wheel 110, so that openings of the plurality of slider wheel pin holes 230 are provided on both of the first side surface 200 and the second side surface 205. In the embodiment shown in FIG. 3, each of the plurality of slider wheel pin holes 230 extends partially through the slider wheel 110, with openings being provided on only the first side surface 200. A pin 235 of the track support assembly 105 may be inserted into one of the plurality of slider wheel pin holes 230, to prevent rotation of the slider wheel 110 relative to the carrier stand 190, as discussed in more detail below. A diameter of each of the plurality of slider wheel pin holes 230 may be in a range of about 10 to about 50 mm, depending on the size of the machine. A diameter of each of the plurality of slider wheel pin holes 230 may be slightly greater than a diameter of the pin 235. For example, the diameter of each of the plurality of slider wheel pin holes 230 may be in a range of about 1 mm to 5 mm greater than the diameter of the pin 235.

FIG. 4 shows a schematic side view of the slider wheel 110 and the carrier stand 190 of the track support assemblies 105 shown in FIG. 2. The carrier stand 190 has carrier stand outer surface 240, and a carrier stand inner surface 245 (shown in FIG. 5), opposite to the carrier stand outer surface 240. The carrier stand 190 also has a carrier stand central opening 250, through which the support member 195 of the track support assembly 105 extends to support the slider wheel 110, as described in more detail below. In an alternative, a carrier stand bushing (not shown) may be provided within the carrier stand central opening 250, instead of within the slider wheel central opening 220, to facilitate rotation of the support member 195 therein. In this alternative embodiment, the support member 195 rotates relative to the carrier stand 190, and not relative to the slider wheel 110, so that a position of the slider wheel 110 relative to the carrier stand 190 may be adjusted. A diameter of the carrier stand central opening 250 may be about the same as the diameter of the slider wheel central opening 220, and may be in a range of about 50 mm to about 200 mm, depending on the size of the machine. For example. A diameter of the carrier stand central opening 250, or of the bushing, in case one is provided within the carrier stand central opening 250, may be slightly greater than a diameter of the support member 195.

The carrier stand 190 may also include a carrier stand pin hole 255, extending through the carrier stand outer surface 240 to the carrier stand inner surface 245, as shown in FIG. 5. The pin 235 of the track support assembly 105 may be inserted into the carrier stand pin hole 255, and into one of the plurality of slider wheel pin holes 230, to prevent rotation of the slider wheel 110 relative to the carrier stand 190, as discussed in more detail below. A diameter of the carrier stand pin hole 255 may be about the same as the diameter of the slider wheel pin holes 230, and may be in a range of about 10 mm to about 50 mm, depending on the size of the machine. A diameter of the carrier stand pin hole 255 may be slightly greater than a diameter of the pin 235.

FIG. 4 also shows the slider wheel 110 behind the carrier stand 190, with the first slider surface 210a, the second slider surface 210b, and the third slider surface 210c, as well as the third slider wheel pin hole 230c in the first side portion 265a. In this position of the slider wheel 110, the first slider wheel pin hole 230a aligns with the carrier stand pin hole 255, so that the first slider surface 210a faces upward, or outward, for contact with and support of tracks 175 of the track chain 170. The slider wheel 110 is configured to rotate to other positions, in which the second slider wheel pin hole 230b or the third slider wheel pin hole 230c aligns with the carrier stand pin hole 255, so that the second slider surface 210b or the third slider surface 210c, respectively, faces upward, or outward, for contact with and support of the tracks 175. The carrier stand 190 may also have at least two carrier stand bolt holes 260, for insertion of bolts (not shown), to secure the carrier stand 190 to the track support frame 135.

FIG. 5 shows a schematic end view of the slider wheel 110 and carrier stand 190, as a first carrier stand 190a, shown in FIG. 4, as well as a second carrier stand 190b. Each of the first carrier stand 190a and the second carrier stand 190b have outer surfaces 240 and inner surfaces 245, with the inner surfaces 245 facing the slider wheel 110. As shown in FIG. 5, the first carrier stand 190a also has a carrier stand pin hole 255 extending from the outer surface 240 to the inner surface 245, with a pin 235 positioned within the carrier stand pin hole 255. Although only the first carrier stand 190a is shown with a carrier stand pin hole 255, the second carrier stand 190b or both the first carrier stand 190a and the second carrier stand 190b may include carrier stand pin holes 255.

The slider wheel 110 has the first side surface 200 and the second side surface 205, each facing an inner surface 245 of one of the first carrier stand 190a and the second carrier stand 190b. In the embodiment shown in FIG. 5, the slider wheel 110 may have a two side portions 265a and 265b and a central portion 270 between the two side portions 265a and 265b. The two side portions 265a and 265b may be provided to interact properly with and to align the tracks 175 of the track chain 170. The central portion 270 may have a height when viewed from the end view that is greater than a height of each of the side portions 265a and 265b, and the height of the central portion 270 may be, for example, about 466 mm. A width of each of the side portions 265a and 265b may be about 141.5 mm and a width of the central portion 270 may be about 139 mm. The central portion 270 of the slider wheel 110 may be configured to slide along rails of the track chain 170. In this embodiment, the plurality of slider wheel pin holes 230 extend through the first side portion 265a, but not through the central portion 270. In one alternative embodiment, the height of the two side portions 265a and 265b of the slider wheel 110 may be greater than the height of the central portion 270, when viewed from the end view. As another alternative, the slider wheel 110 may be formed as a single body of material, having the same height when viewed from the end view, with the plurality of slider wheel pin holes 230 extending to a predetermined pin hole depth into the slider wheel 110. FIG. 5 shows the first slider surface 210a, the second slider surface 210b, and the first slider wheel pin hole 230a of the slider wheel 110 shown in FIGS. 3 and 4. In the position of the slider wheel shown in FIG. 5, the first slider wheel pin hole 230a aligns with the carrier stand pin hole 255, so that the first slider surface 210a faces upward, or outward, for contact with and support of tracks 175 of the track chain 170. As noted, above, the slider wheel 110 is configured to rotate to other positions, in which the second slider wheel pin hole 230b or the third slider wheel pin hole 230c, shown in FIG. 3, aligns with the carrier stand pin hole 255, so that the second slider surface 210b or the third slider surface 210c, respectively, faces upward, or outward, for contact with the tracks 175 and support of the track chain 170.

Figures 6, 7:
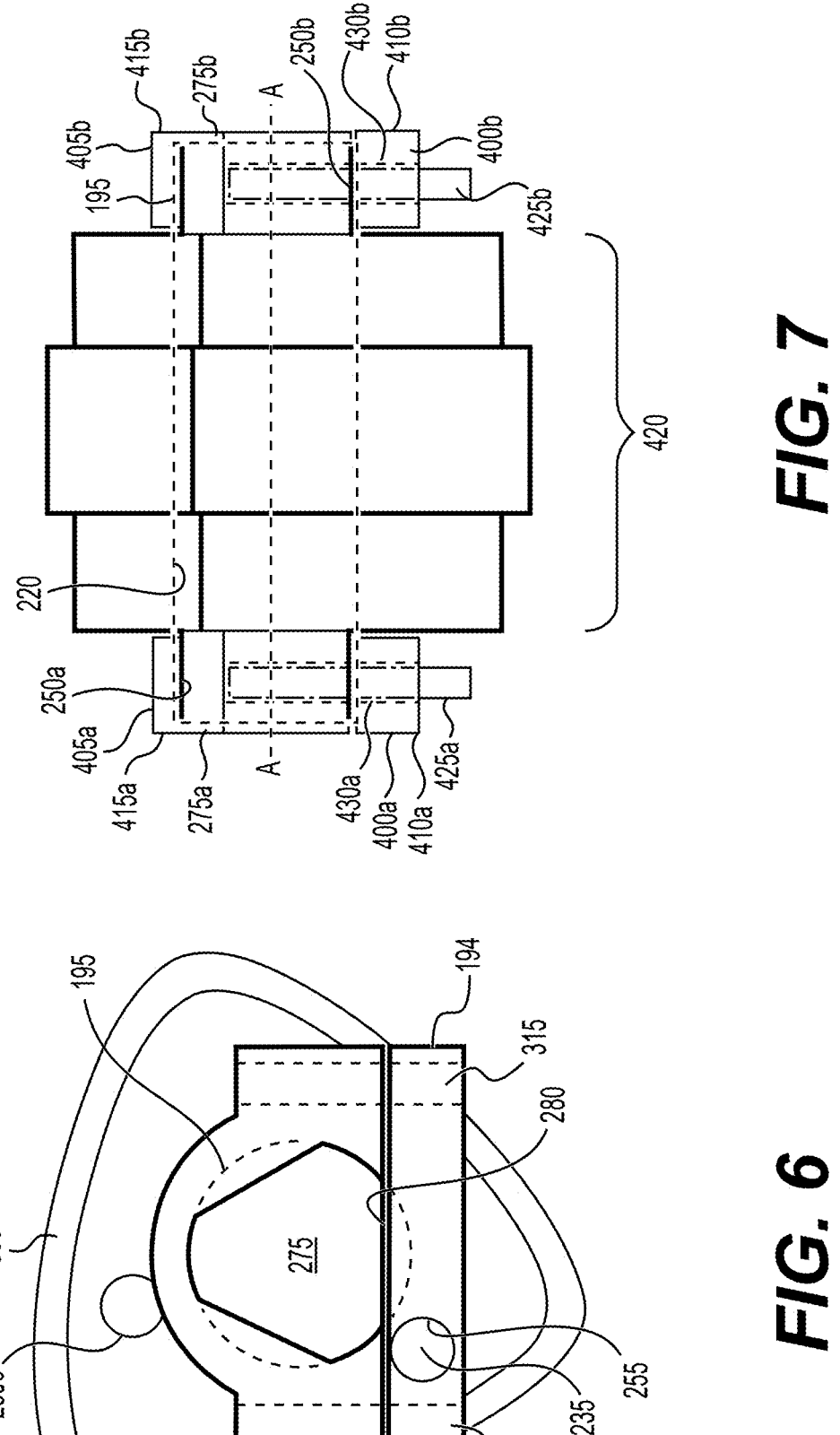
FIG. 6 shows a schematic side view of an alternative track support assembly, in accordance with the present disclosure.
FIG. 7 shows a schematic end view of an alternative track support assembly, in accordance with the present disclosure.

FIG. 6 shows a schematic side view of an alternative embodiment of the track support assembly 105 shown in FIG. 2, including a slider wheel 300. In particular, in this embodiment, a carrier stand 305 may include a top portion 192 and a bottom portion 194, secured together and clamping the support member 195 within the carrier stand central opening 250, using suitable hardware, such as bolts (not shown), inserted through bolt holes 310. The carrier stand 305 may also have a relatively smaller, triangular central hole 280 at at least one end that does not allow for axial movement of the support member 195 of the track support assembly 105 of this embodiment. FIG. 6 also shows the pin 235 of the track support assembly 105, aligning with the carrier stand pin hole 255 and one of the plurality of slider wheel pin holes 230 (here, the first slider wheel pin hole 230a, shown in FIG. 3). Although a pin 235 is shown and described herein, other devices, such as a bolt having threads, or a dowel pin with a cotter may be used. In an embodiment in which a bolt is used, the slider wheel pin holes 230 may be threaded so that when the bolt is inserted into the slider wheel pin holes 230, threads of the bolt engage with threads of the slider wheel pin holes 230 to securely hold the slider wheel 110 in position.

FIG. 7 shows a schematic end view of a track support assembly 105 according to another embodiment. The support member 195 is shown extending through the carrier stand central opening 250a of a first carrier stand 400a, between a top portion 405a of the first carrier stand 400a and a bottom portion 410a of the first carrier stand 400a, through the slider wheel central opening 220, and through the carrier stand central opening 250b of a second carrier stand 400b, between a top portion 405b of the second carrier stand 400b and a bottom portion 410b of the second carrier stand 400b. The support member 195 may be secured between the carrier stands 400a and 400b by virtue of securing the top portions 405a and 405b to the bottom portions 410a and 410b of the first carrier stand 400a and the second carrier stand 400b, respectively. In addition or alternatively, the support member 195 may be secured between the carrier stands 400a and 400b using end caps 275a and 275b mounted on or adjacent to carrier stand outer surfaces 415a and 415b, respectively, although other securing mechanisms may be used. FIG. 7 also shows alignment of the support member 195, along a longitudinal axis A-A, and the two carrier stand central openings 250a and 250b. As noted above, the support member 195 may be a cylindrical rod or shaft. In addition, the support member 195 and could have steps, that is, portions having different outer diameters and/or cross-sectional shapes. Also, the support member 195 could be one with the slider wheel 420, or integrally formed with the slider wheel 420. In addition, FIG. 7, shows pins 425a and 425b of the track support assembly 105 extending through a carrier stand pin hole 430a of the first carrier stand 400a and a carrier stand pin hole 430b of the second carrier stand 400b. In the embodiment of FIG. 7, two pins 425a and 425b may be used, with one pin inserted into each of the two carrier stands 400a and 400b.

INDUSTRIAL APPLICABILITY

The slider wheel 110 (300, 420) of the present disclosure, as part of a track support assembly 105 of a track type machine, such as the dozer 100 shown in FIG. 1, is relatively easy to install, adjust, and replace, and has a relatively longer work life. In particular, the slider wheel 110 (300, 420) may be installed in existing track support assemblies, without the need for specialized or unique mounting mechanisms or equipment. As the tracks 175 of the track chain 170 slide over and wear an outward facing slider surface 210 of the slider wheel 110 (300, 420), the slider wheel 110 (300, 420) may be adjusted by removing the pin 235 from the pin hole 230 of the slider wheel 110 (300, 420), rotating the slider wheel 110 (300, 420) so a new slider surface 230 faces outward, and securing the slider wheel 110 (300, 420) into an adjusted position by reinserting the pin 230 into another pin hole 230 of the slider wheel 110 (300, 420). Once the slider wheel 110 (300, 420) has been adjusted, with the new slider surface 210 facing outward, the tracks 175 of the track chain 170 may be properly aligned and supported on the new slider surface 210, and may easily move or slide across the new slider surface 210, until adjustment is needed again. The plurality of slider surfaces 210 of the slider wheel 110 (300, 420) thus provide multiple wear surfaces, and by adjusting the slider wheel 110 (300, 420) and using one slider surface 210, or one wear surface, for a period of time, the slider wheel 110 (300, 420) has a relatively prolonged work life as compared to known rollers having a single cylindrical wear surface or a slider having a single wear surface. In other words, the slider wheel 110 (300, 420) of the present disclosure leverages three wear surfaces during the work life of the slider wheel 110 (300, 420). After all of the plurality of slider surfaces 210 have worn (which may be determined, for example, based a predetermined thickness remaining on the slider surface 210 or based on a predetermined amount of time having elapsed), the slider wheel 110 (300, 420) may be replaced with a new slider wheel 110 (300, 420) having a plurality of slider surfaces 210.

Figure 8:
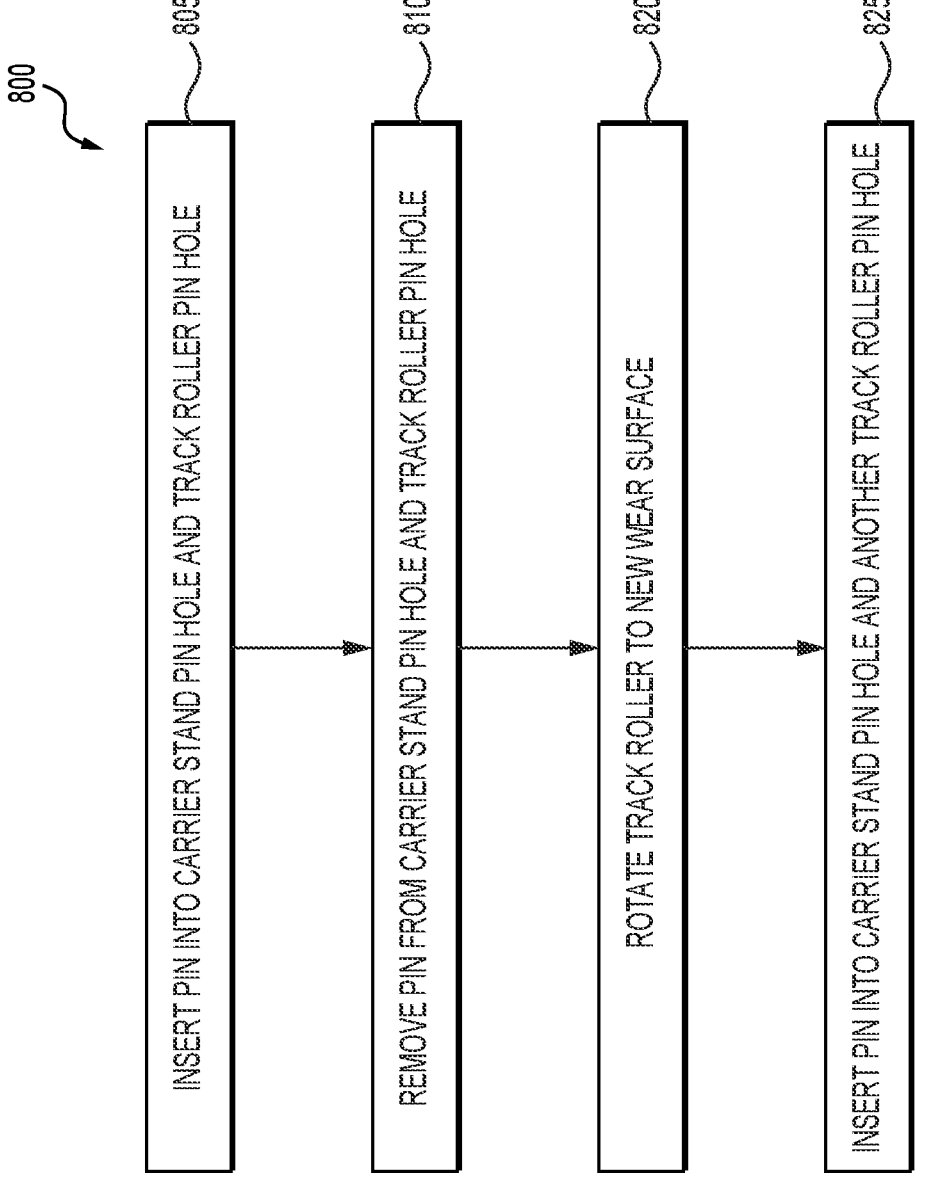
FIG. 8 shows a flow chart of a method for adjusting a track support assembly, in accordance with the present disclosure.

FIG. 8 shows a flowchart of a method 800 for adjusting a track support assembly 105. The method 800 may include a step 805 of inserting the pin 235 of the track support assembly 105 into the carrier stand pin hole 255, of one or more carrier stands 190 of the track support assembly 105, and into one of the plurality of slider wheel pin holes 230, of the slider wheel 110 of the track support assembly 105. The slider wheel pin hole 230, of the plurality of slider wheel pin holes 230, into which the pin 235 is inserted, aligns with the carrier stand pin hole 255, so that the pin 235 extends through both pin holes. In the embodiments shown in FIGS. 2 to 6, the slider wheel 110 has three slider surfaces 210a—a first slider surface 210a, a second slider surface 210b, and a third slider surface 210c—and three slider wheel pin holes 230—a first slider wheel pin hole 230a, a second slider wheel pin hole 230b, and a third slider wheel pin hole 230c. Step 805 may include, for example, inserting the pin 235 into the first slider wheel pin hole 230a of the slider wheel 110. Once the pin 235 is inserted into the first slider wheel pin hole 230a of the slider wheel 110, the pin 235 prevents rotation of the slider wheel 110 relative to the one or more carrier stands 190. In addition, once the pin 235 is positioned within the first slider wheel pin hole 230a, one slider surface 210, of a plurality of slider surfaces 210 of the slider wheel 110, is then secured in position to face outward towards tracks 175 of the track chain 170. If the pin 235 is inserted into the first slider wheel pin hole 230a, the first slider surface 210a of the slider wheel 110 faces the tracks 175. Then, the tracks 175 move and slide across the first slider surface 210a, as the engine 120 of the track type machine powers the sprocket 140 to propel the track assembly 150 forward or backward.

The method 800 may also include a step 810 of removing the pin 235 from the carrier stand pin hole 255 and the one of the plurality of slider wheel pin holes 230. The step 810 may be performed upon determining that the slider surface 210 that faces the tracks 175 of the track chain 170 has worn to a predetermined thickness, for example. Alternatively, the step 810 may be performed after the slider surface has been used for a predetermined amount of time, in terms of hours of operation of the track assembly 150. Following the example embodiments shown in FIGS. 2 to 6, step 810 may include removing the pin 235 from the first slider wheel pin hole 230*a* and from the carrier stand pin hole 255, and this may be performed after determining that the first slider surface 210*a* has worn or after a predetermined amount of time of use of the first slider surface 210*a* has elapsed.

After the pin 235 has been removed from the slider wheel pin hole 230 and the carrier stand pin hole 255 in step 810, the method 800 may include a step 820 of rotating the slider wheel 110 on the support member 195 of the track support assembly 105, until another one of the plurality of slider wheel pin holes 230 aligns with the carrier stand pin hole 255. The rotating of the slider wheel 110 results in another one of the plurality of slider surfaces 210 facing outward towards the tracks 175 of the track chain 170. Following the embodiments shown in FIGS. 2 to 6, in step 820, rotating the slider wheel 110 may include rotating the slider wheel 110 so that the second slider surface 210*b* or the third slider surface 210*c* faces the tracks 175, and the second slider wheel pin hole 230*b* or the third slider wheel pin hole 230*c*, respectively, aligns with the carrier stand pin hole 255. The step 815 may include rotating the slider wheel 110 by a predetermined amount, e.g., an angle of rotation. The angle of rotation may correspond to a number of slider surfaces 210 of the slider wheel 110. For example, when the slider wheel 110 includes three slider surfaces 210, the angle of rotation of the slider wheel 110 may be about 120°. The angle of rotation may be other values, and in particular, may be a value in the range of about 1° to about 180°.

Further, the method 800 may include a step 825 of inserting the pin 235 into the carrier stand pin hole 255 and into the other one of the plurality of slider wheel pin holes 230, to prevent rotation of the slider wheel 110 relative to the carrier stand 190. Following the embodiments shown in FIGS. 2 to 6, the step 820 may include, for example, inserting the pin 235 into one of the second slider wheel pin hole 230*b* or the third slider wheel pin hole 230*c*, so that the second slider surface 210*b* or the third slider surface 210*c*, respectively, of the slider wheel 110 faces the tracks 175. With step 825, adjustment of the slider wheel 110 may be complete. Although the method 800 is described as including the steps 805 to 825, the method 800 may include some of the steps (that is, a subset of these steps) or additional steps. For example, the method 800 may also include repeating of steps 805 to 820, to adjust the slider wheel 110 so that another slider surface 210, of the plurality of slider surfaces 210, faces the tracks 175 of the track chain 170. As a more specific example, the method 800 may include repeating steps 802 to 825 until all three slider surfaces 210, of the slider wheel 110 shown in FIGS. 2 to 6, have been used and the slider wheel 110 has reached the end of its work life.

It will be apparent to those skilled in the art that various modifications and variations can be made to the disclosed slider wheel and related track support assembly and method for adjustment, without departing from the scope of the disclosure. Other embodiments of the slider wheel, track support assembly, and related method for adjustment will be apparent to those skilled in the art from consideration of the specification and the accompanying figures. It is intended that the specification, and, in particular, the examples provided herein be considered as exemplary only, with a true scope of the disclosure being indicated by the following claims and their equivalents.

I claim:

1. A slider for a track support assembly, the slider comprising:
   a first side surface;
   a second side surface;
   a central opening located in a center of the first side surface and the second side surface and extending through the slider from the first side surface to the second side surface; and
   a plurality of distinct, arc-shaped slider surfaces, the plurality of slider surfaces forming a non-circular sliding circumferential surface located between the first side surface and the second side surface, and being located radially relative to the central opening.

2. The slider according to claim 1, further including a plurality of pin holes in at least one of the first side surface and the second side surface, the plurality of pin holes configured to secure the slider in position.

3. The slider according to claim 1, wherein the plurality of slider surfaces includes three slider surfaces.

4. The slider according to claim 2, wherein the plurality of pin holes are located radially relative to the central opening.

5. The slider according to claim 1, wherein a radius of curvature of each of the plurality of slider surfaces is in a range of about 200 mm to about 1000 mm.

6. The slider according to claim 1, wherein edges between two slider surfaces, of the plurality of slider surfaces, are curved.

7. The slider according to claim 6, wherein a radius of curvature of the edges between the two slider surfaces is in a range of about 10 mm to about 50 mm.

8. The slider according to claim 1, further comprising a first side portion, a central portion, and a second side portion, the central portion being between the first side portion and the second side portion, the central portion having a height that is greater than a height of each of the first side portion and the second side portion.

9. The slider according to claim 1, wherein the slider is formed of one of a wear-resistant material and a work-hardened material.

10. A track support assembly for a track-type machine, the track support assembly comprising:
    a slider formed of a single body of a material, the slider having:
       a first side surface;
       a second side surface;
       a plurality of distinct, arc-shaped slider surfaces, the plurality of slider surfaces forming a non-circular sliding circumferential surface located between the first side surface and the second side surface; and
       a plurality of slider pin holes in at least one of the first side surface and the second side surface;
    at least one carrier stand having a carrier stand pin hole; and
    a pin insertable into the carrier stand pin hole and one of the plurality of slider pin holes, such that when the pin is inserted into the carrier stand pin hole and the one of the plurality of slider pin holes, the pin secures the slider in a position.

11. The track support assembly according to claim 10, wherein a number of the plurality of slider surfaces is the same as a number of the plurality of slider pin holes.

12. The track support assembly according to claim 11, wherein the plurality of slider surfaces includes three slider surfaces and wherein the plurality of pin holes includes three pin holes.

13. The track support assembly according to claim 10, wherein:

the at least one carrier stand further has a carrier stand central opening, and the slider further has a slider central opening, located in a center of the first side surface and the second side surface and extending through the slider from the first side surface to the second side surface, wherein the plurality of slider pin holes are located radially relative to the slider central opening; and the track support assembly further comprises a support member that extends through the carrier stand central opening and the slider central opening, and configured to rotatably support the slider.

14. The track support assembly according to claim 13, wherein the support member is separate from the slider.

15. The track support assembly according to claim 10, wherein a radius of curvature of each of the plurality of slider surfaces is in a range of about 200 mm to about 1000 mm.

16. The track support assembly according to claim 10, wherein edges between two slider surfaces, of the plurality of slider surfaces, are curved, and a radius of curvature of the edges between the two slider surfaces is in a range of about 10 mm to about 50 mm.

17. The track support assembly according to claim 10, wherein the slider further has a first side portion, a central portion, and a second side portion, the central portion being between the first side portion and the second side portion, the central portion having a height that is greater than a height of each of the first side portion and the second side portion.

18. The track support assembly according to claim 10, wherein the material of which slider is formed is of one of a wear-resistant material and a work-hardened material.

19. A method for adjusting a slider of a track support assembly, the slider including a first side surface, a second side surface, and a plurality of distinct, arc-shaped slider surfaces, the plurality of slider surfaces forming a non-circular sliding circumferential surface located between the first side surface and the second side surface, the method comprising:

unsecuring the slider to allow rotation of the slider;

rotating the slider on a support member of the track support assembly until a new arc-shaped slider surface is positioned for engagement with a track associated with the track support assembly; and securing the slider to prohibit rotation of the slider.

20. The method according to claim 19, wherein the unsecuring and securing of the slider includes removing and inserting, respectively, a pin with aligned pin holes in a carrier stand supporting the slider.

* * * * *